Oct. 29, 1968     E. SHULMAN     3,408,471
METHOD OF MAKING CUTTING DIES BY ELECTROEROSION
Filed Oct. 19, 1965
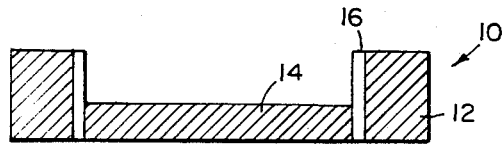
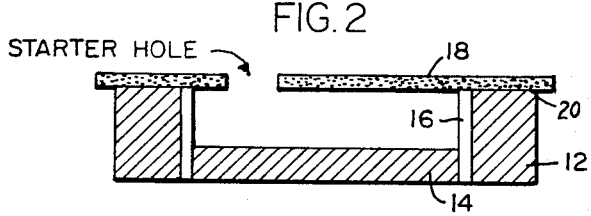
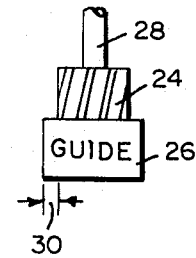
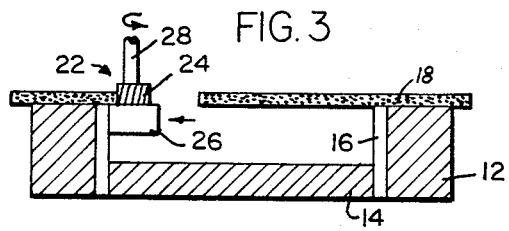
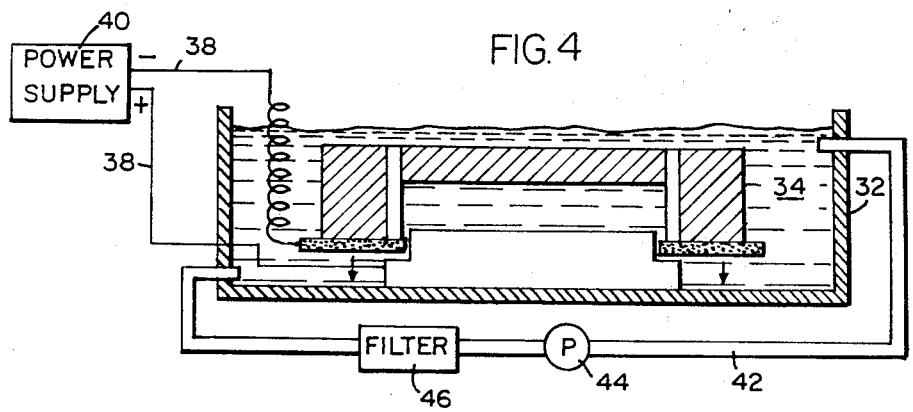
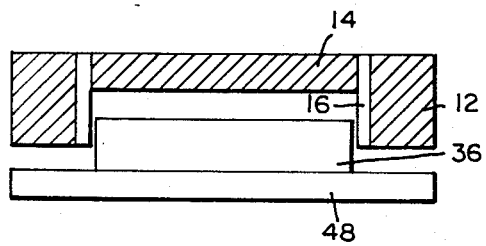
INVENTOR
ELLIOTT SHULMAN
BY, Richard P. Crowley
ATTORNEY : 3,408,471
METHOD OF MAKING CUTTING DIES BY ELECTROEROSION
Elliott Shulman, New York, N.Y., assignor to British Industries Corporation, Plainview, N.Y., a corporation of New York
Filed Oct. 19, 1965, Ser. No. 497,724
7 Claims. (Cl. 219—69)

ABSTRACT OF THE DISCLOSURE

Cutting dies for use in working sheet metal are prepared by securing a graphite slab under the upper surface of one die member; forming the graphite slab to the outline of the cutting edge of the die member with a desired overlapping of the graphite over the cutting edge of the die, machining the graphite with a guide member set to the desired clearance distance in contact with the edge of the one die during the machining of the graphite, employing the die member with the graphite thereon as one electrode in an electro-machining discharge process with the other electrode being a rough cut die material from which the complementary die member is to be formed and electro-machining the rough cut die member.

---

My invention relates to a method of making cutting dies to be used in working sheet material and is designed particularly for the manufacture of steel rule die sets for the production of stampings and the like of irregular outline.

The use of electro-discharge machining (E.D.M.) or electro-erosion for the manufacture of conventional stamping dies is well-known as evidenced by U.S. Patent 2,924,701, Patent 3,154,664 and others, such as for blanking, piercing or other forming operations on sheet metal material. A typical rule die set includes a steel rule female die and a shaped piece as a male punch member, which is received in the female die with the desired clearances. Either die may be made first and then used as a template to lay out or to prepare the other member. The clearances between the individual die members must be carefully controlled and taken into account in preparing a die set to produce burr free stampings of the desired quality. The preparation of die rule sets with close tolerances for the preparation of any irregularly contoured punching is usually quite expensive and time consuming.

It is an object of my invention to provide a new and improved method of preparing a steel rule die set.

Another object of my invention is to provide a method of making cutting dies which permits the manufacture of a die for the production of irregular outline articles at low cost and with accurately dimensioned die clearances. These and other objects will be apparent to those persons skilled in the art from the following more detailed description of my method taken in connection with the accompanying drawing wherein:

FIG. 1 is an elevation in section of a steel rule female die member.

FIG. 2 is an elevation in section illustrating a graphite slab material secured to the upper surface and outside frame of the female die member.

FIG. 3 is an elevation in section illustrating the use of a router to machine out the graphite slab to the proper internal die clearances.

FIG. 3A is an enlarged section in elevation of the router used in FIG. 3.

FIG. 4 is an elevation in section illustrating the electrical discharge machining of a hardened tool steel plate to form the male punch member.

FIG. 5 is an elevation in section of the steel rule die set made by my method.

Briefly, my invention involves the manufacture of a standard type of steel rule die members; however, instead of using the die member as a template for casting a plastic master which is subsequently used for the preparation of the other punch member, I secure a graphite slab to one die member. This graphite slab is then machined out following the periphery of the one die member, and then this die member employed as a conventional E.D.M. electrode for finished machining a rough cut hardened tool steel plate to form the opposite die member. The use of a graphite slab as the electrode material for the one die member provides an inexpensive material which is easy to machine and which has refractory and good conductive properties. My method of accurately machining, cutting, grinding or otherwise shaping out to the desired tolerance a graphite slab material in combination with lower than ordinary voltages in the E.D.M. process provides smooth sided punch members having sharp edges and with clearances of 0.005 inch or less. Conventional E.D.M. processes which attempt to vary clearance of the die punch members by varying the voltage often result in clearances of 0.010 inch or higher, while the high voltage often causes pitting of the one die member. My method, therefore, permits die clearance to be adjusted by machining out to the desired tolerance as illustrated or by adjusting the voltage and amperage of the E.D.M. power supply to provide either rough or fine cutting conditions or a combination of these techniques. Stampings of a variety of sheet material by dies prepared by my method provide stamping parts which are clean and burr-free. My method, therefore, provides for the preparation of dies with close tolerances on die clearances, and is an inexpensive method to form die sets to produce stampings having an irregular outline.

One embodiment of my method is illustrated in the drawing wherein a standard female die member is used to prepare a male punch member. The female die member, with a graphite slab secured thereto and machined out to the desired clearances, is used as one electrode in a standard E.D.M. process to prepare the male punch member. A female cutting die member 10 is prepared by providing a wooden die board 12 cut to the proper size and on which the outline of the shape to be punched out of the sheet material is marked. The die board 12 is then cut along the prescribed lines and the centerpiece 14 of the die board removed. Steel rule blade 16, together with the centerpiece 14, are then reassembled to form the female cutting die member shown as 10. A good fit of the steel rule blades between the centerpiece 14 and the die board 12 may be provided by using a saw for cutting out the centerpiece 14 which has a thickness approximately equivalent to that of the blade means 16, or by removing the centerpiece and machining or cutting it in some manner to the desired thickness. The upper or female die member 10 shown forms a die with the outside frame of the die board 12 flush with the top of the steel rule blades 16. A slab of graphite 18 or other electrode material having similar characteristics is secured by an adhesive 20 or other means over and across the upper surface and the top of the die board 12 and the steel rule blades 16. The graphite slab should extend over the outline of the top of the steel rule blades 16 and inwardly a distance greater than the die clearances desired. For the purposes of illustration the graphite slab 18 is shown over the entire upper surface of the female die cavity or outline.

A starter hole is made or provided for the insertion of a router 22 or other means to cut, machine, grind or otherwise form the graphite 18 to the desired outline of the internal cavity of the female die member 10. The router 22 shown comprises a rotating axle 28, a cylindrical grinding or machining member secured to the axle for rotation therewith, and a guide means 26 extending a predetermined desired amount outside of the outside circumference of the grinding element 24 to provide the desired die clearance 30. My router is shown in enlarged section in FIG. 3A with a greatly enhanced and exaggerated clearance 30 between the guide 26 and the grinder 24 for the purposes of illustration. The graphite slab 18 is routed out to the desired shape and tolerance by placing the edge of the guide member 26 against the inside edge of the blade 16 of the female die 10 and permitting the grinding element 24 to rout out the graphite 18 in the female die cavity and outside of this area.

Hardened tool steel 36 or other material may be used for preparing the male die member and is rough cut to the shape required with allowance for machining. The female die member 10 with the machined out graphite slab 18 secured thereto and the rough cut hardened tool steel 36 are then employed in a typical E.D.M. process as shown more fully in FIG. 4. A power supply 40 with electrical lead 38 of opposite polarity are secured as shown with one lead connected to the routed graphite material of the female die 10 and the other lead of opposite polarity connected to the hardened tool steel 36. The power supply 40 is usually provided with adjustable current and frequency control devices to provide voltage potentials up to several hundred volts. The female die member 10 with the graphite routed slab material 18 is then employed as the cutting tool electrode, while the hardened tool steel member 36 is the work piece electrode. A liquid dielectric fluid like oil 34 is placed in a container 32 and means provided for the cleaning and recirculation of the dielectric fluid during the E.D.M. process by pump 44 and filter 46 through a recirculation conduit 42. As the E.D.M. process proceeds, the cutting electrode of the routed graphite material 18 cuts its way into the hardened tool steel 36 to form a male punch member having the desired die clearances. After the E.D.M. process is completed, electrode material is ground off and the die members sharpened. A male punch member of hardened tool steel 36 is then secured to a mounting plate 48, and mounted in an opposing manner with the female die member as a finished die set as shown in FIG. 5.

My method therefore permits the preparation of die sets with good die clearances at low cost and provides a means to produce stampings of sheet material having an irregular outline.

What I claim is:

1. A method of making a cutting die set which method comprises:
   providing one die member characterized by a cutting edge having the outline of a stamping to be produced by the die set, and from which the other die member is to be formed;
   securing a graphite slab over and to the upper surface of the one die member, with the graphite extending over the cutting edge of the one die member;
   forming the graphite slab to the outline of the cutting edge of the one die member with a desired predetermined clearance distance extending from the cutting edge;
   said forming of the graphite being accomplished by machining the graphite with a guide member set to the desired clearance distance in contact with the edge of the one die during the machining of the graphite;
   employing the one die member with the formed graphite secured thereto as one electrode in an electro-machining discharge process, with the other electrode being a rough cut die material from which the complementary die member is to be formed; and
   electro-machining the rough cut die material to form the complementary and other die member.

2. The method of claim 1 which includes cleaning the die members of electrode material and mounting the die members for use in a stamping operation.

3. The method of claim 1 wherein the graphite is secured to the upper surface of the one die member by an adhesive.

4. The method of claim 1 wherein the one die member is a female steel rule die, the graphite slab is secured to the upper surface of the female die and across the female die cavity, and the graphite routed out to the desired clearance distance employing a guided router.

5. A method as defined in claim 1 wherein the thus formed complementary die members have a clearance of less than 0.005 inch.

6. The method as defined in claim 1 wherein said guide member includes a cylindrical grinding member.

7. The product prepared by the method which comprises:
   providing one die member characterized by a cutting edge having the outline of a stamping to be produced by the die set, and from which the other die member is to be formed;
   securing a graphite slab over and to the upper surface of the one die member, with the graphite extending over the cutting edge of the one die member;
   forming the graphite slab to the outline of the cutting edge of the one die member with a desired predetermined clearance distance extending from the cutting edge;
   said forming of the graphite being accomplished by machining the graphite with a guide member set to the desired clearance distance in contact with the edge of the one die during the machining of the graphite;
   employing the one die member with the formed graphite secured thereto as one electrode in an electro-machining discharge process, with the other electrode being a rough cut die material from which the complementary die member is to be formed; and
   electro-machining the rough cut die material to form the complementary and other die member.

References Cited

UNITED STATES PATENTS 2,927,190  3/1960  Dublebohn et al.
3,120,601  2/1964  Berlin et al.

RICHARD M. WOOD, *Primary Examiner.*

R. F. STAUBLY, *Assistant Examiner.*